United States Patent
Ishibashi

(10) Patent No.: US 9,367,267 B2
(45) Date of Patent: Jun. 14, 2016

(54) RELAYING DEVICE, IMAGE PROCESSING DEVICE, AND SYSTEM COMPRISING IMAGE PROCESSING DEVICE AND RELAYING DEVICE AND IMAGE DATA CONVERSION PROCESS

(71) Applicant: Masayuki Ishibashi, Nagoya (JP)

(72) Inventor: Masayuki Ishibashi, Nagoya (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 14/143,417

(22) Filed: Dec. 30, 2013

(65) Prior Publication Data

US 2014/0185075 A1     Jul. 3, 2014

(30) Foreign Application Priority Data

Dec. 28, 2012 (JP) .................................. 2012-287126

(51) Int. Cl.
*G06F 3/12* (2006.01)
*H04N 1/00* (2006.01)
*G06K 15/00* (2006.01)

(52) U.S. Cl.
CPC ............ *G06F 3/1206* (2013.01); *G06F 3/1245* (2013.01); *G06F 3/1247* (2013.01);
(Continued)

(58) Field of Classification Search
CPC ......... G06F 3/12; G06F 3/126; G06F 3/1229; G06F 3/1234; G06K 15/00
See application file for complete search history.

(56) References Cited

U.S. PATENT DOCUMENTS 6,636,891 B1 * 10/2003 LeClair .................. H04L 67/40
358/1.15

(Continued)

FOREIGN PATENT DOCUMENTS

| CN | 102681801 A | 9/2012 |
| EP | 2 498 177 A2 | 9/2012 |

(Continued)

OTHER PUBLICATIONS

Extended European Search Report dated Jun. 6, 2014 from related European Application No. 13 19 9911.2.

(Continued)

*Primary Examiner* — Barbara Reinier
*Assistant Examiner* — Henok A Shiferaw
(74) *Attorney, Agent, or Firm* — Scully, Scott, Murphy & Presser, P.C.

(57) ABSTRACT

A relaying device may be configured to communicate with an image processing device and a server device via a network. The server device may store first type data which cannot be interpreted by the image processing device and second type data which can be interpreted by the image processing device. The relaying device may receive, from the image processing device, data selection instruction information identifying selection data. The relaying device may receive, from the server device, the selection data identified by the received data selection instruction information. The relaying device may execute conversion processing in a case that the received selection data is the first type data. The conversion processing may convert the selection data into converted data which can be interpreted by the image processing device. The relaying device may receive converted data reception information for causing the image processing device to receive the converted data.

19 Claims, 7 Drawing Sheets

(52) U.S. Cl.
CPC ............ *G06F3/1271* (2013.01); *G06F 3/1288* (2013.01); *G06F 3/1297* (2013.01); *H04N 1/00244* (2013.01); *H04N 2201/0024* (2013.01); *H04N 2201/0094* (2013.01)

(56) References Cited

U.S. PATENT DOCUMENTS

| | | | | |
|---|---|---|---|---|
| 7,180,614 | B1* | 2/2007 | Senoo | G06F 3/1204 358/1.14 |
| 7,349,869 | B2* | 3/2008 | Oakeson | G06Q 10/10 705/26.5 |
| 2004/0068461 | A1* | 4/2004 | Schluetter | G06Q 20/10 705/37 |
| 2006/0262349 | A1 | 11/2006 | Moroi | |
| 2008/0133560 | A1* | 6/2008 | Ferlitsch | H04N 1/00344 |
| 2011/0149333 | A1* | 6/2011 | Hong | G06F 3/1204 358/1.15 |
| 2011/0205593 | A1 | 8/2011 | Moroi | |
| 2011/0292442 | A1 | 12/2011 | Nakagawa | |
| 2012/0224211 | A1* | 9/2012 | Ferlitsch | G06F 3/1206 358/1.13 |
| 2012/0229845 | A1 | 9/2012 | Maekawa et al. | |
| 2012/0243026 | A1* | 9/2012 | Waller | G06F 3/1207 358/1.15 |
| 2014/0022600 | A1 | 1/2014 | Moroi | |
| 2014/0247459 | A1 | 9/2014 | Maekawa et al. | |
| 2014/0327934 | A1 | 11/2014 | Moroi | |
| 2016/0021273 | A1 | 1/2016 | Moroi | |

FOREIGN PATENT DOCUMENTS

| | | |
|---|---|---|
| JP | 2005-149220 A | 6/2005 |
| JP | 2005-269250 A | 9/2005 |
| JP | 2006-352845 A | 12/2006 |
| JP | 2008-229993 A | 10/2008 |
| JP | 2011-248764 A | 12/2011 |
| WO | 2011080994 A1 | 7/2011 |

OTHER PUBLICATIONS

Chinese Office Action dated Dec. 31, 2015 from related Chinese Patent Application No. 201310741432.3, together with an English language translation.

Japanese Official Action dated Mar. 1, 2016 received in related application JP 2012-287126 together with an English language translation.

* cited by examiner

RELAYING DEVICE, IMAGE PROCESSING DEVICE, AND SYSTEM COMPRISING IMAGE PROCESSING DEVICE AND RELAYING DEVICE AND IMAGE DATA CONVERSION PROCESS

CROSS-REFERENCE TO RELATED APPLICATION

This application claims priority from Japanese Patent Application No. 2012-287126, filed on Dec. 28, 2012, the contents of which are hereby incorporated by reference into the present application.

TECHNICAL FIELD

The present specification discloses a relaying device connected with an image processing device and a server via a network.

BACKGROUND ART

In recent years, an electronic file storing service capable of storing an electronic file in a storage server on a network has been widespread.

SUMMARY

A desired electronic file may be downloaded from an electronic file storing service to an image processing device, and the downloaded electronic file may be used to execute printing processing by the image processing device. However, when data formats which can be interpreted by the image processing device are limited, there are cases in which processing to download from the electronic file storing service and print an electronic file in a data format which cannot be interpreted by the image processing device cannot be executed.

In one aspect of the teachings disclosed herein, a relaying device may be provided. The relaying device may comprise a network interface configured to connect with a network, a processor coupled to the network interface, and a memory storing instructions. The instructions, when executed by the processor, may cause the relaying device to perform receiving via the network interface, a image processing device which is connected with the network, data selection instruction information identifying selection data selected from among data stored in a server device which is: configured to store first type data which cannot be interpreted by the image processing device and second type data which can be interpreted by the image processing device; and connected with the network. The instructions may cause the processor to perform receiving, from the server device via the network interface, the selection data identified by the received data selection instruction information. The instructions may cause the processor to perform executing conversion processing in a case that the received selection data is the first type data. The conversion processing may convert the selection data into converted data which can be interpreted by the image processing device. The instructions may cause the processor to perform receiving converted data reception information for causing the image processing device to receive the converted data.

In another aspect of the teachings disclosed herein, an image processing device may be provided. The image processing device may comprise a network interface configured to connect with a network, and a control device coupled to the network interface. The control device may be configured to perform selecting selection data from among data stored in a server device which is: configured to store first type data which cannot be interpreted by the image processing device and second type data which can be interpreted by the image processing device; and connected with the network. The control device may be configured to perform transmitting via the network interface, first requirement information for requiring converted data reception information, to a relaying device which is connected with the network, in a case that the selection data is the first type data. The converted data reception information may be for causing the image processing device to receive converted data which can be interpreted by the image processing device from the relaying device. The converted data may be received by executing conversion processing converting the selection data into the converted data in the relaying device. The control device may be configured to perform receiving, from the relaying device via the network interface, the converted data reception information transmitted from the relaying device based on the transmitted first requirement information. The control device may be configured to perform receiving, from the relaying device via the network interface, the converted data based on the received converted data reception information. The control device may be configured to perform transmitting via the network interface, second requirement information for requiring selection data reception information, to the relaying device, in a case that the selection data is the second type data. The selection data reception information may be for causing the image processing device to receive the selection data from the server device. The control device may be configured to perform receiving, from the relaying device via the network interface, the selection data reception information transmitted from the relaying device based on the transmitted second requirement information. The control device may be configured to perform receiving, from the relaying device via the network interface, the selection data based on the received selection data reception information.

EMBODIMENT (System Configuration)

Figure 1:
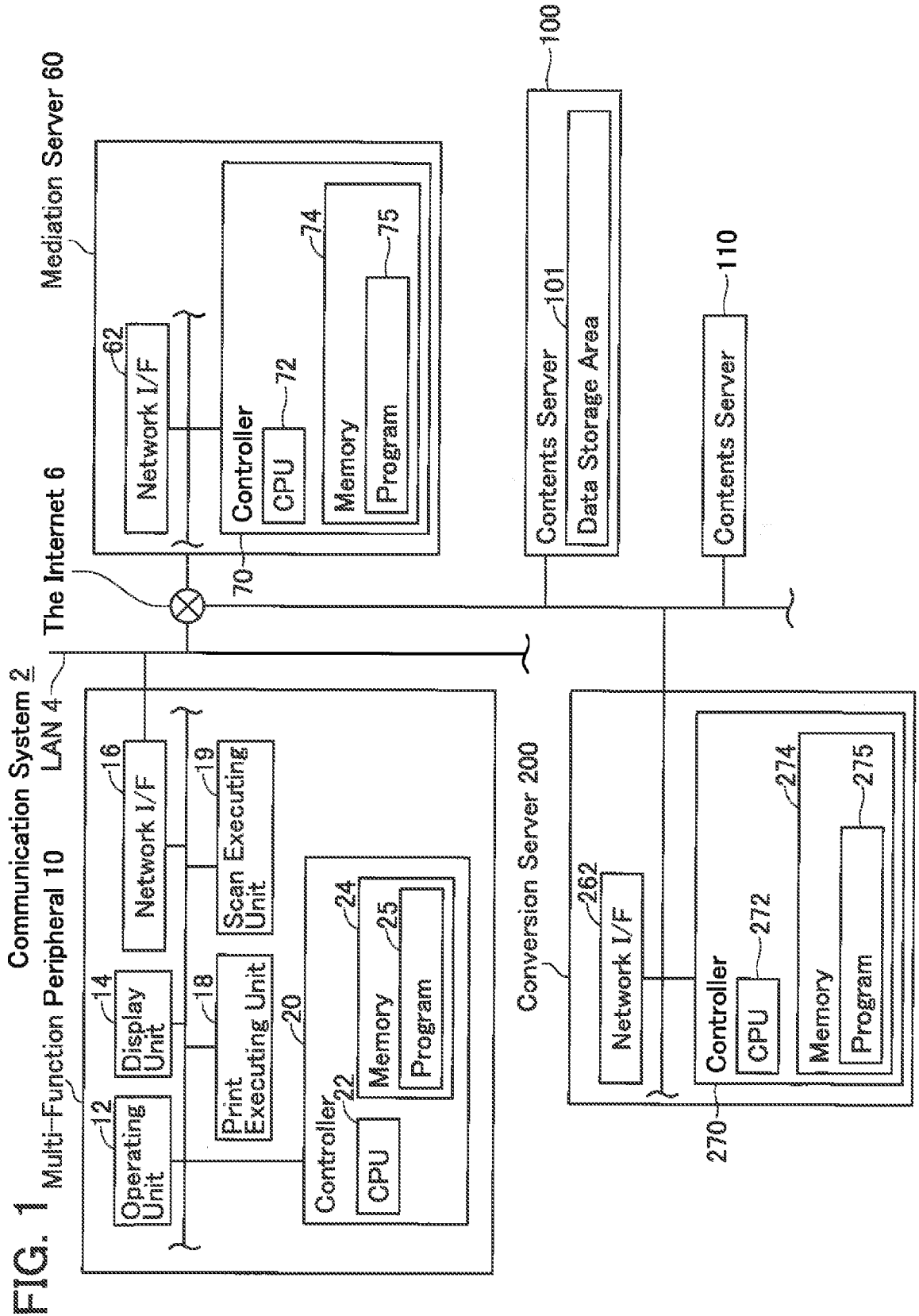
FIG. 1 shows the configuration of a communication system.

As shown in FIG. 1, a communication system 2 includes a multi-function peripheral 10, a mediation server 60, contents servers 100 and 110, and a conversion server 200. The multi-function peripheral 10 is connected with a LAN 4. The mediation server 60, the contents servers 100 and 110, and the conversion server 200 are connected with the Internet 6.

(Structure of Multi-Function Peripheral 10)

The multi-function peripheral 10 may execute a Printing function, a Scan function, a Copy function, a FAX function, or the like. The multi-function peripheral 10 comprises an operating unit 12, a display unit 14, a network interface 16, a print executing unit 18, a scan executing unit 19, and a controller 20. The operating unit 12 has a plurality of keys. A user can input various instructions to the multi-function peripheral 10 by operating the operating unit 12. The display unit 14 is a display for displaying various pieces of information. The network interface 16 is connected to the LAN 4. The print executing unit 18 comprises an inkjet or laser printing mechanism. The scan executing unit 19 comprises a scan mechanism such as a CCD or CIS. The controller 20 comprises a CPU 22 and a memory 24. The CPU 22 executes various processes in accordance with program 25 stored in the memory 24.

(Structure of Mediation Server 60)

The mediation server 60 is a server independent of the conversion server 200 and the contents servers 100 and 110. The mediation server 60 is a server for mediating supply of image data from the contents servers 100 and 110 to the multi-function peripheral 10. The mediation server 60 is a server provided by a vendor of the multi-function peripheral 10. The mediation server 60 includes a network interface 62 and a controller 70. The controller 70 includes a CPU 72 and a memory 74. The CPU 72 performs various processing in accordance with a program 75 stored in the memory 74.

(Structure of the Conversion Server 200)

The conversion server 200 is a server configured as a separate entity from the mediation server 60 and the contents servers 100 and 110. The conversion server 200 executes conversion processing, described below, of data of various types. The conversion server 200 may be a server which is provided to a vendor of the multi-function peripheral 10. The conversion server 200 comprises a network interface 262 and a controller 270. The controller 270 comprises a CPU 272 and memory 274. The memory 274 stores a program 275. The CPU 272 executes various processing according to the program 275.

Some features relating to the description in the present specification are hereby explained. In the present specification, the description "the CPU 72 of the mediation server 60 receives various types of information" includes the technical meaning "the CPU 72 of the mediation server 60 receives various types of information via the network interface 62". Further, the description "the CPU 72 of the mediation server 60 transmits various types of information" includes the technical meaning "the CPU 72 of the mediation server 60 outputs various types of information via the network interface 62". Similar features exist regarding the CPU 272 of the conversion server 200 and the network interface 262. Similar features exist regarding the CPU 22 of the multi-function peripheral 10 and the network interface 16.

In the present specification, a case is explained in which the mediation server 60 and conversion server 200 are connected by the Internet 6 (that is, when a device functioning as the mediation server 60 and a device functioning as the conversion server 200 are disposed at physically distant positions), but other configurations are possible. The mediation server 60 and conversion server 200 may be realized as a single server. In this case, in the single server, a program which functions as the mediation server 60 and a program which functions as the conversion server 200 run, and communication between the programs is performed via a bus in the server. When the mediation server 60 and conversion server 200 are realized as a single server, in the present specification, communication which is explained as communication between the mediation server 60 and the conversion server 200 may be taken to mean communication between the program which functions as the mediation server 60 and the program which functions as the conversion server 200. Further, a configuration may be realized in which a program which functions as the mediation server 60, and moreover also functions as the conversion server 200, runs on a single server. In this case, in the present specification, communication which is explained as communication between the mediation server 60 and the conversion server 200 may replaced with passing of data within the program which functions as the mediation server 60 and which moreover functions as the conversion server 200.

(Structure of Content Servers 100 and 110)

The contents servers 100 and 110 each are a server used for an online service provided by the vender of the multi-function peripheral 10. The contents servers 100 and 110 are so called storage servers. Note that the contents servers 100 and 110 may be servers used for an online service for lending file storage areas of the respective contents servers 100 and 110 to a user. The online service includes "Evernote (registered trademark of Evernote Corporation)", "Google (registered trademark of Google, Inc.) Does", "PICASA (registered trademark of Google, Inc.), "FACEBOOK (registered trademark of Facebook, Inc.)", etc. A user of the online service can upload or download various types of data to or from a storage area assigned to the user via the Internet 6.

The contents server 100 comprises a data storage area 101. The data storage area 101 is an area in which various data is stored. Data stored in the data storage area 101 includes the first type data, which cannot be interpreted by the multi-function peripheral 10, and the second type data, which can be interpreted by the multi-function peripheral 10. An example of the first type data is data in a document file format. Specific examples of the data in the document file format include data in a word processing software format, data in a spreadsheet software format, and data in a presentation software format. An example of the second type data is data in an image file format. Specific examples of the data in the image file format include data in the REG (abbreviation of Joint Photographic Experts Group) format, data in a bitmap format, and data in the GIF (abbreviation of Graphics Interchange Format) format.

(Role of Mediation Server 60)

A business operator providing the contents server discloses a dedicated API (abbreviation of Application Program Interface) for requiring a reply of a folder name of a folder stored in the contents server or a file name of image data stored in the contents server. When the multi-function peripheral supports an API of the contents server, the multi-function peripheral can require a reply of information of the contents server. When specification of the API is changed, it becomes necessary to update software of the multi-function peripheral to support the changed API. However, it is painful for the user to update the software of the multi-function peripheral that is already operating. Accordingly, in the embodiment, the mediation server 60 is provided in order that the multi-function peripheral 10 can download data from the contents server even when the multi-function peripheral 10 does not support the API of the contents server. That is, the mediation server 60 supports the API for requiring a reply of a folder name of a folder stored in the contents server or a file name of image data stored in the contents server. Furthermore, there is a case in that a plurality of contents servers of different types is connected to the Internet. Furthermore, the business operator providing each contents server discloses a dedicated API (abbreviation of Application Program Interface) to download data from the contents server. It is necessary for the multi-function peripheral 10 to support APIs of a plurality of contents servers in order to download data from the respective contents servers, so that it is necessary to store a number of programs. However, storage capacity of a memory of the multi-function peripheral 10 is small as compared with a PC, etc.

Figure 2:
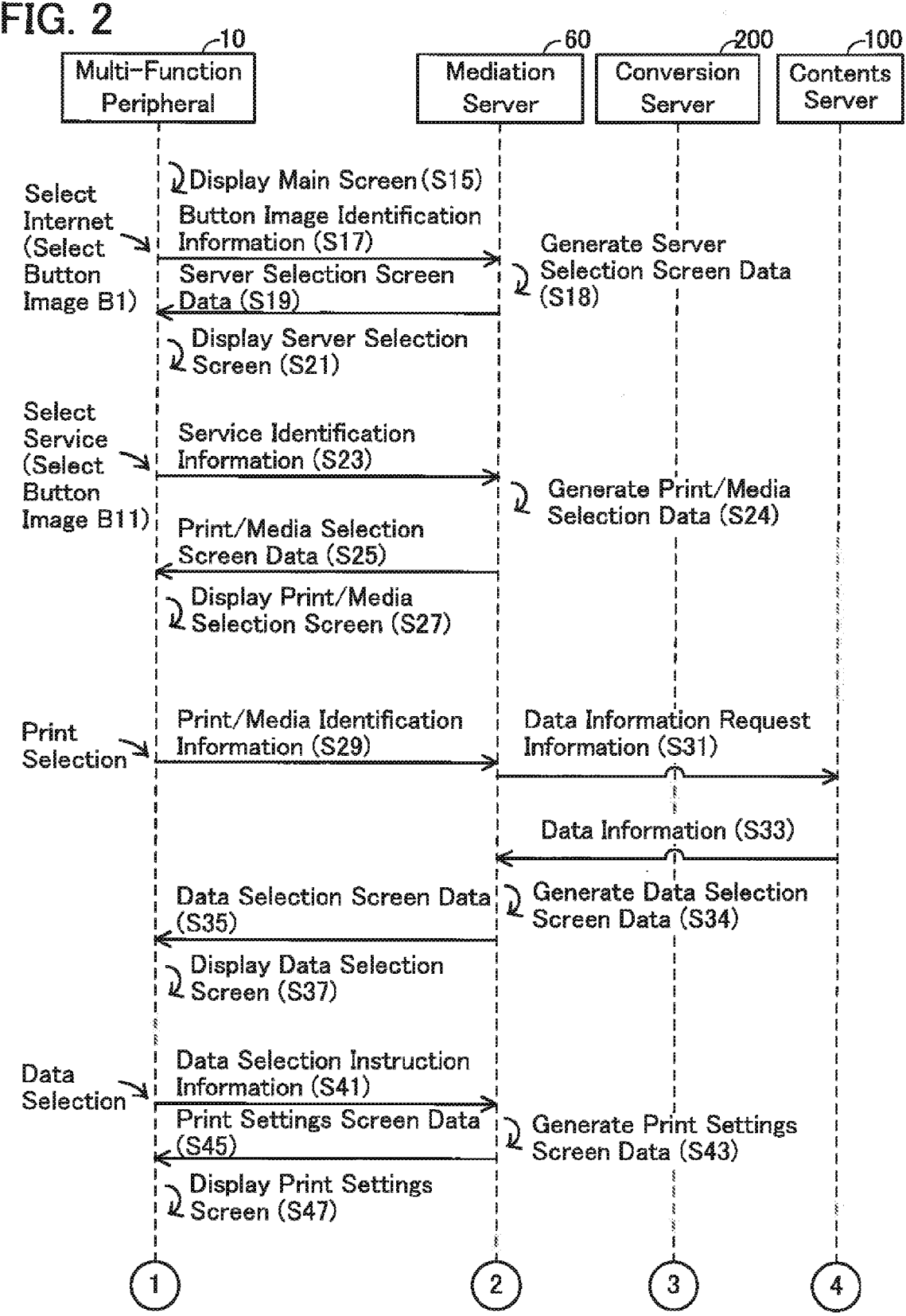
FIG. 2 shows a sequence diagram of various processing executed by each device.

Accordingly, in the embodiment, the mediation server 60 is provided so that the multi-function peripheral 10 can download data from each of the plurality of contents servers without storing a number of programs in the multi-function peripheral 10. That is, the mediation server 60 supports a plurality of APIs for the plurality of respective contents servers. Then, in a state that the multi-function peripheral 10 downloads data from a specific contents server (for example, the contents server 100) among the plurality of contents servers, the mediation server 60 uses an API for the specific contents server to perform various communications to be described below (for example, communication in S31 illustrated in FIG. 2 and communication in S53, S73 and S79 illustrated in FIG. 3) with the specific contents server. Herewith, the multi-function peripheral 10 can download data from the specific contents server even when the multi-function peripheral 10 does not support the API for the specific contents server.

(Operation of Communication System)

Operation of the communication system will be described using sequence diagrams of FIGS. 2 to 6. Upon receiving an order for displaying a main screen, the CPU 22 of the multi-function peripheral 10 cause the display unit 14 to display the main screen in S15. The order for displaying the main screen may be input from the operating unit 12 by a user. Data for displaying the main screen may be preliminarily stored in the memory 24. An example of the main screen 201 is shown in FIG. 7. The main screen 201 includes button images B1 to B4. The button images B1 to B4 are images for receiving an input of an execution order among a plurality of functions. The functions accepted by the button images B1 to B4 are an Internet function, a Copy function, a FAX function, and a Print function, respectively.

In the description example of the present embodiment, a case of downloading image data from the contents server 100 will be described. In this case, the button image B1 included in the main screen 201 is selected. In S17, the CPU 22 of the multi-function peripheral 10 sends button image identification information for identifying the selected button image B1 to the mediation server 60. An example of the button image identification information is "Internet" which is the name of the button image B1.

Upon receiving the button image identification information from the multi-function peripheral 10, the CPU 72 of the mediation server 60 specifies a server selection screen 211 as a screen data that is subsequently to be sent to the multi-function peripheral 10. The server selection screen 211 is a screen for allowing the user to select any one of the contents servers 100 and 110.

In S18, the CPU 72 of the mediation server 60 generates server selection screen data for displaying the server selection screen 211. Information (not illustrated) indicating which information needs to be included in the server selection screen data is stored in the memory 74. The CPU 72 of the mediation server 60 generates the server selection screen data according to this information. The server selection screen data includes information indicating that button images B11 and B12 are to be included in the server selection screen 211, information indicating that a screen for selecting any one of the button images B11 and B12 is to be displayed, information indicating that server names "Server 100" and "Server 110" correspond to the button images B11 and B12, respectively, and information indicating character strings to be displayed in association with the button images B11 and B12. In S19, the CPU 72 of the mediation server 60 sends the server selection screen data to the multi-function peripheral 10.

Figure 8:
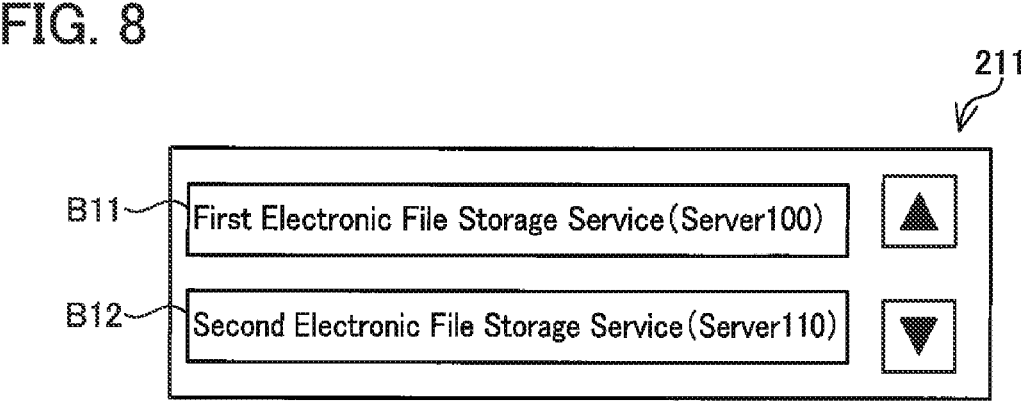
FIG. 8 shows an example of a server selection screen display.

Upon receiving the server selection screen data from the mediation server 60, the CPU 22 of the multi-function peripheral 10 displays the server selection screen 211 on the display unit 14 in S21. As illustrated in FIG. 8, the server selection screen 211 includes the button images B11 and B12. The button images B11 and B12 are images for accepting selection of the contents servers 100 and 110, respectively. The CPU 22 of the multi-function peripheral 10 creates bitmap information or the like for displaying the images of the button images B11 and B12 based on the server selection screen data received from the mediation server 60 and displays the server selection screen 211 on the display unit 14. In this manner, since the bitmap information is created by the multi-function peripheral 10, bitmap information for displaying the images of the button images B11 and B12 does not need to be included in the server selection screen data. Further, bitmap information for displaying the Up and Down arrow buttons illustrated in FIG. 8 does not need to be included in the server selection screen data. The user operates the operating unit 12 to select a button image that represents the contents server, from which image data is to be downloaded, on the server selection screen 211. In the present embodiment, a case that the user selects the button image B11 (that is, the contents server 100) will be described as an example. Notably, the concept of "selecting a server" may include a concept of "selecting a service". Specifically, selecting the contents server 100 may be equivalent to selecting a service that the contents server 100 provides. Further, in a case that a plurality of servers for providing one service is present, the concept of "selecting a server" may include the concept of selecting at least one of the plurality of servers.

In S23, the CPU 22 of the multi-function peripheral 10 transmits service identification information corresponding to the button image selected by the user to the mediation server 60. In the example explained in the present embodiment, service identification information, including the server name "Server 100", is transmitted to the mediation server 60. In S24, the CPU 72 of the mediation server 60 generates print/media selection screen data to cause display of a print/media selection screen based on service identification information received from the multi-function peripheral 10. The print/media selection screen is a screen to accept input as to whether to execute printing processing or to execute processing to save to media as processing using the data downloaded from the contents server.

In S25, the CPU 72 of the mediation server 60 transmits the print/media selection screen data to the multi-function peripheral 10. In S27, the CPU 22 of the multi-function peripheral 10, upon receiving the print/media selection screen data from the mediation server 60, causes the display unit 14 to display the print/media selection screen. The print/media selection screen includes a screen to accept selections of printing processing and processing to save to media. Because the print/media selection screen is similar to the above-described server selection screen 211, a detailed explanation is omitted. The user operates the operating unit 12 to select a button image representing processing to be executed on the print/media selection screen. In the present embodiment, explanation is continued for a case in which selection of the button image for printing execution is accepted.

In S29, the CPU 22 of the multi-function peripheral 10 transmits print/media identification information corresponding to the button image selected by the user to the mediation server 60. In the example explained in the present embodiment, information indicating that printing was selected is transmitted. In S31, the CPU 72 of the mediation server 60 transmits data information request information to the contents server 100. The data information request information is information requesting data information. The data information is information to identify each of a plurality of selected data items stored in a contents server. One example of the data information is a file name. In S33 the contents server 100, upon receiving the data information request information from the mediation server 60, transmits the data information to the mediation server 60.

In S34, the CPU 72 of the mediation server 60 generates data selection screen data to cause display of a data selection screen 221 based on the data information received in S33. The data selection screen is a screen to cause the user to select data for downloading. In the example explained in the present embodiment, the data selection screen data includes information indicating that the button images B21 to B25 are included in the data selection screen 221, information indicating that a screen is to be displayed for selection of one of the button images B21 to B25, and information indicating file names corresponding to each of the button images B21 to B25. in S35, the CPU 72 transmits the data selection screen data to the multi-function peripheral 10.

Figure 9:
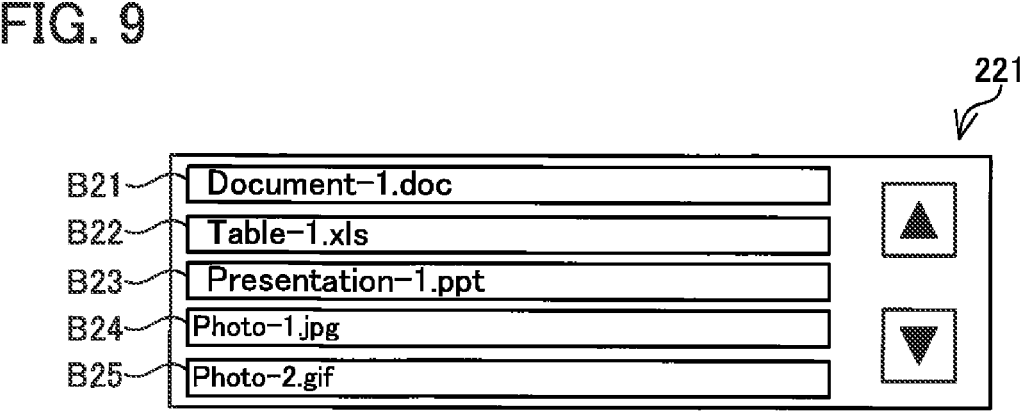
FIG. 9 shows an example of a data selection screen display.

In S37 the CPU 22 of the multi-function peripheral 10, upon receiving the data selection screen data from the mediation server 60, causes the data selection screen 221 to be displayed by the display unit 14. The CPU 22 then accepts processing to select selection data from among a plurality of data items stored in the contents server 100. The selection data is data selected for downloading from the contents server 100. The CPU 22 may also accept processing to select a plurality of selection data items. As shown in FIG. 9, the data selection screen 221 includes the button images B21 to B25. Each of the button images B21 to B25 is an image for accepting selection of the selection data. The user operates the operating unit 12 to select a button image from the data selection screen 221 in order to access the data to be downloaded.

In S41, the CPU 22 of the multi-function peripheral 10 transmits data selection instruction information corresponding to the button image selected by the user to the mediation server 60. The data selection instruction information is information to identify selection data. In the example explained in the present embodiment, information indicating that data corresponding to the button image B21 has been selected is transmitted. The data selection instruction information may be described using a URL (abbreviation of Uniform Resource Locator) description method. in S43, the CPU 72 of the mediation server 60 generates print settings screen data to cause display of a print settings screen based on the data selection instruction information. The print settings screen is a screen to accept input of various print settings (for example, sheet size, color mode, and similar).

In S45, the CPU 72 of the mediation server 60 transmits the print settings screen data to the multi-function peripheral 10. In S47 the CPU 22 of the multi-function peripheral 10, upon receiving the print settings screen data from the mediation server 60, causes the display unit 14 to display the print settings screen. The CPU 22 accepts input of various print settings by the user via the operating unit 12.

In S51, the CPU 22 of the multi-function peripheral 10 transmits the print settings information to the mediation server 60. In S53, the CPU 72 of the mediation server 60 transmits data detail information request information, to request data detail information, to the contents server 100. Examples of the data detail information include extensions indicating the format of selection data, data update dates, and data sizes.

In S55, the CPU 72 receives the data detail information from the contents server 100. When there is a plurality of selection data items selected in S37, the data detail information is received for each of the plurality of selection data items, Further, based on the received data detail information, the CPU 72 determines whether the selection data is in a format which can be interpreted by the multi-function peripheral 10. The result of determination of whether the interpretation is possible is temporarily stored in memory 74. For example, when an extension included in the data detail information corresponding to the selection data does not match any of the extensions stored in advance in memory 74 as extensions indicating data formats which can be interpreted by the multi-function peripheral 10, it may be determined that the format cannot be interpreted by the multi-function peripheral 10. When there is a plurality of selection data items selected in S37, a determination result for the possibility of interpreting is generated for each of the plurality of selection data items, and the determination on the possibility of the interpretation are stored in memory 74.

In S57, the CPU 72 of the mediation server 60 specifies one selection data item for which the printing processing has not been executed from among the one or plurality of selection data items selected for downloading in S37. A determination is made as to whether the specified selection data is in a format which cannot be interpreted by the multi-function peripheral 10. In the determination, the determination result for the possibility of interpretation for the specified selection data item may be read out from memory 74. When the selection data item is in a format which can be interpreted by the multi-function peripheral 10 (S57: NO), conversion processing order processing P1 and wait command processing P2, described below, are skipped, and processing proceeds to S153. However, when the format cannot be interpreted (S57: YES), processing proceeds to S73, and the conversion processing order processing P1 and wait command processing P2 are executed.

The conversion processing order processing P1 (S73 to S121) is processing to download the selection data which cannot be interpreted by the multi-function peripheral 10 from the contents server 100 to the mediation server 60, and upload the data to the conversion server 200. In this processing, an order is issued to execute the conversion processing for all the selection data uploaded to the conversion server 200. The conversion processing is processing in which, if the received selection data is the first type data which cannot be interpreted by the multi-function peripheral 10, the received selection data is converted into the converted data which is the second type data, which can be interpreted by the multi-function peripheral 10. A specific example of the conversion processing is processing to convert data in a word processing software format into data in the JPEG format.

The conversion processing order processing P1 is described below. In S73, the CPU 72 of the mediation server 60 transmits download source URL request information to the contents server 100. The download source URL request information is information requesting a download source URL to access selection data identified by the data selection instruction information received in S41. The contents server 100, upon receiving the download source URL request information from the mediation server 60, references the data storage area 101, and specifies a download source URL to access selection data specified by the download source URL request information. In S75, the contents server 100 transmits the specified download source URL to the mediation server 60.

In S79, the CPU 72 of the mediation server 60 transmits download request information to the contents server 100. The download request information contains the download source URL received in S75. The download request information is information to request the contents server 100 to transmit the selection data specified by the download source URL. In S81, the contents server 100 transmits to the mediation server 60 the selection data specified by the download source URL.

In S111, the CPU 72 of the mediation server 60 transmits upload data ID reception request information to the conversion server 200. The upload data ID reception information is information to request of the conversion server 200 an upload data ID to identify selection data uploaded to the conversion server 200. In S113, the CPU 272 of the conversion server 200 transmits the upload data ID to the mediation server 60.

In S115, the CPU 72 transmits to the conversion server 200 the selection data received from the contents server in S81, together with the upload data ID received in S113. In S117, the CPU 272 of the conversion server 200 transmits to the mediation server 60 upload result information indicating whether or not processing to store the selection data in association with the upload data ID was successful.

In S119, the CPU 72 transmits data conversion request information to the conversion server 200. The data conversion request information is information to request execution of the conversion processing of the selection data identified by the upload data ID received in S113 (that is, selection data uploaded to the conversion server 200 in S115). In S121, the CPU 272 of the conversion server 200 transmits converted data reception information to the mediation server 60. The converted data reception information may include a conversion job ID, The conversion job ID is information for identifying the conversion processing performed according to a processing for requesting the execution of the conversion processing (S119). The converted data reception information may be described by a URL description method.

Wait command processing P2 (S131 to S142) is processing to cause the multi-function peripheral 10 to wait until the completion of conversion processing, once the conversion processing has been started for one selection data item.

The wait command processing P2 is described below. The conversion server 200 executes the conversion processing of the selection data upon reception of the data conversion request information in S119. The conversion processing may be performed for the selection data divided into prescribed data amounts (for example, 100 kB).

In S131, the CPU 72 transmits conversion completion confirmation request information to the conversion server 200. The conversion completion confirmation request information is information requesting confirmation by the conversion server 200 as to whether the conversion processing requested of the conversion server 200 in S119 has been completed.

In S132, the CPU 272 of the conversion server 200 determines whether conversion processing has completed. Specifically, using the converted data reception information included in the conversion completion confirmation request information, one conversion processing item for determination as to whether the conversion processing has completed is specified. Then, it is determined whether the conversion of a prescribed amount of data (for example, 100 kB) in the leading portion of the selection data to be converted in the speci-fied conversion processing has completed. If conversion processing has not completed (S132: NO), processing proceeds to S133.

In S133, the CPU 272 transmits to the mediation server 60 incomplete conversion notification information indicating that conversion processing has not completed. In S135, the CPU 72 of the mediation server 60 generates a wait command upon reception of the incomplete conversion notification information. The wait command is an order to cause the multi-function peripheral 10 to wait for the completion of the conversion processing. In. S137, the CPU 72 transmits the wait command to the multi-function peripheral 10.

In S139, the CPU 22 of the multi-function peripheral 10 executes wait processing to wait for the completion of the conversion processing. The wait processing may for example be processing in which a timer which had been started to detect a timeout of the conversion processing is reset and again started. Or, for example, the wait processing may be processing in which, by increasing the timeout time stored in memory 24 such that the time until timeout of conversion processing is extended, whereby the time until timeout of conversion processing is lengthened. The reason for executing the wait processing will be explained. If the time from transmission of information from the multi-function peripheral 10 to the mediation server 60 until reception by the multi-function peripheral 10 of information returned by the mediation server 60 in response to the information exceeds the timeout time, a timeout error occurs. Then, error processing occurs in the multi-function peripheral 10. As the error processing, the occurrence of an error display, the occurrence of reset processing to retransmit information from the multi-function peripheral 10 to the mediation server and return processing by the multi-function peripheral to S15, and similar are conceivable. Regarding the completion of the conversion processing, if the period until the multi-function peripheral 10 receives the information returned by the mediation server in response to the transmission (S51) of the print settings information (for example, converted data reception instruction information (S157)) exceeds the timeout time, a timeout error occurs. Hence by performing the wait processing, the occurrence of the timeout error is prevented.

In S141, the CPU 22 transmits to the mediation server 60 the wait processing completion information indicating that wait processing execution has completed. Then processing returns to S131.

However, if in S132 it is determined that the conversion processing has completed (S132: YES), the processing proceeds to S142. In S142, the CPU 272 of the conversion server 200 transmits to the mediation server 60 the conversion completion notification information indicating that the conversion processing of a prescribed data amount in the leading portion of the selection data has completed.

In S152, the CPU 72 of the mediation server 60 determines whether the data used in the printing processing is the converted data or the selection data. Specifically, when the data used in the printing processing is in a format which cannot be interpreted by the multi-function peripheral 10, it is determined that the converted data is used, and when the data is in a format which can be interpreted by the multi-function peripheral 10, it is determined that the selection data is used. The determination may also be made using the method described above in S57. When it is determined that the data used in the printing processing is the converted data (S152: converted data), it is determined that first printing processing P3 is to be executed, and the processing proceeds to S153.

Figure 5:
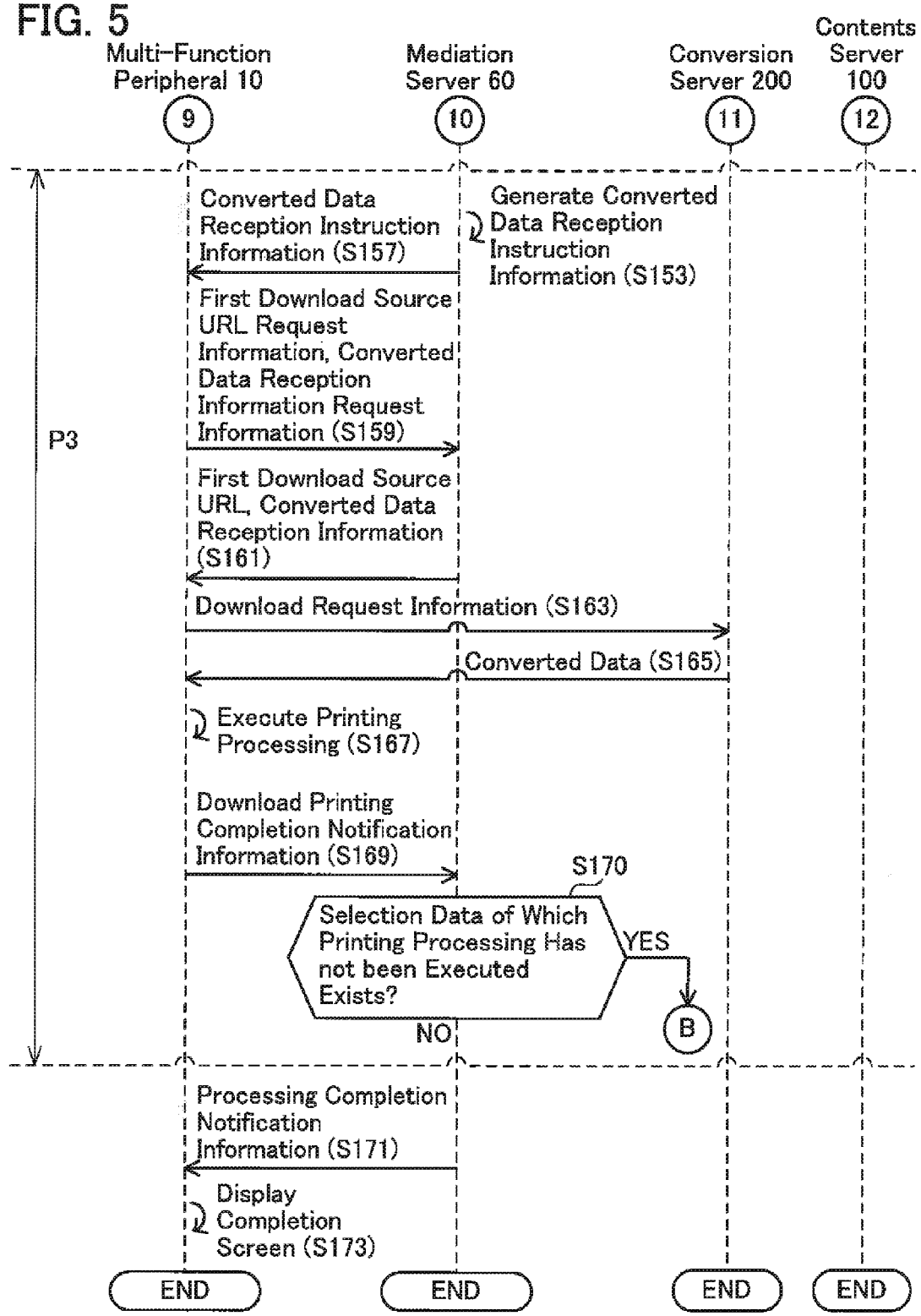
FIG. 5 shows a sequence diagram of various processing executed by each device.

FIG. 5 is used to explain the first printing processing P3. The first printing processing P3 (S153 to S170) is processing to cause execution of printing by the multi-function peripheral 10 using the converted data. In S153, the CPU 72 of the mediation server 60 generates converted data reception instruction information. The converted data reception instruction information is an instruction to cause the multi-function peripheral 10 to receive the converted data from the conversion server 200 and execute printing. If there exists selection data for which conversion processing has not yet been executed, the CPU 72 includes conversion processing execution request information in the converted data reception instruction information. However, if there does not exist selection data for which conversion processing has not yet been executed, conversion processing end request information is included in the converted data reception instruction information. The conversion processing execution request information and the conversion processing end request information may be included in the converted data reception instruction information using the URL description method.

In S157, the CPU 72 transmits the converted data reception instruction information to the multi-function peripheral 10. In S159, the CPU 22 of the multi-function peripheral 10 transmits first download source URL request information and the converted data reception information request information to the mediation server 60. The first download source URL request information is information to request of the mediation server 60 a first download source URL to access the converted data, for which conversion completion confirmation was performed in S131. The converted data reception information request information is information to identify the job which has generated converted data, for which conversion completion confirmation was performed in S131.

In S161, the CPU 72 transmits the first download source URL and the converted data reception information to the multi-function peripheral 10. According to this, upon the completion of the conversion processing of a prescribed amount of data in the leading portion of the selection data (S132: YES), information to receive the converted data is transmitted to the multi-function peripheral 10.

In S163, the CPU 22 of the multi-function peripheral 10 transmits to the conversion server 200 download request information in order to download the converted data identified by the converted data reception information, based on the first download source URL. In S165, the CPU 272 of the conversion server 200 transmits the converted data identified by the download request information to the multi-function peripheral 10. In the conversion server 200, when processing to convert selection data is performed for prescribed amounts of data (for example, 100 kB) at a time, at the time the download request information is transmitted to the conversion server in S163, there are cases in which conversion of all the selection data has not ended. In such cases, the conversion server immediately returns to the multi-function peripheral 10 information indicating that conversion is not completed. The information is returned immediately, and thus there is no occurrence of a timeout in the multi-function peripheral 10. The multi-function peripheral 10, having received information indicating that conversion is not completed, returns to S163, and again transmits the download request information to the conversion server, In S163, at the time when the download request information is transmitted to the conversion server, even if the conversion of all the selection data is not ended, in S165 the conversion server may transmit a prescribed amount of the converted data to the multi-function peripheral 10, and the multi-function peripheral 10 may receive the prescribed amount of the converted data. Then the processing may return to S163 and the multi-function peripheral 10 may transmit to the conversion server the download request information requesting the remaining converted data.

In S167, the CPU 22 of the multi-function peripheral 10 causes the print executing unit 18 to execute the printing processing. The printing processing may be executed in the minimum printable units of the printing data. For example, when the print executing unit 18 is an inkjet printer, the printing processing may be executed in line units. When the print executing unit 18 is a laser printer, the printing processing may be executed in units of a single printing sheet.

In S169, when the printing processing for one converted data item is completed, the CPU 22 transmits to the mediation server 60 download printing completion notification information indicating that download printing is completed. The download printing completion notification information may include the conversion processing execution request information or the conversion processing end request information which had been included in the converted data reception instruction information received in S157.

In S170, the CPU 72 of the mediation server 60 determines whether there exists selection data for which printing processing has not yet been executed. The determination as to whether there is selection data for which printing processing has not been executed may for example be performed by determining whether there is selection data for which conversion processing has not been executed. The determination as to whether there is selection data for which conversion processing has not been executed may be performed based on download printing completion notification information received from the multi-function peripheral 10. Specifically, when the conversion processing execution request information is included in the download printing completion notification information, it may be determined that there exists selection data for which conversion processing has not yet been executed. Further, when conversion processing end request information is included in download printing completion notification information, it may be determined that there does not exist selection data for which conversion processing has not yet been executed.

When there exists selection data for which printing processing has not yet been executed (S170: YES), the processing returns to S57 (FIG. 3), and the next selection data item for printing is specified. A determination is then made as to whether the specified selection data is in a format which cannot be interpreted by the multi-function peripheral 10.

Meanwhile, when there does not exist selection data for which printing processing has not yet been executed (S170: NO), the processing proceeds to S171. In S171, the CPU 72 of the mediation server 60 transmits the processing completion notification information to the multi-function peripheral 10. In S173, the CPU 22 of the multi-function peripheral 10 causes a completion screen to be displayed by the display unit 14.

Meanwhile, when in S152 it is determined that the data used in the printing processing is the selection data (S152: selection data), it is determined that second printing processing P3a can be executed without performing the conversion processing, and processing proceeds to S153a.

Figure 6:
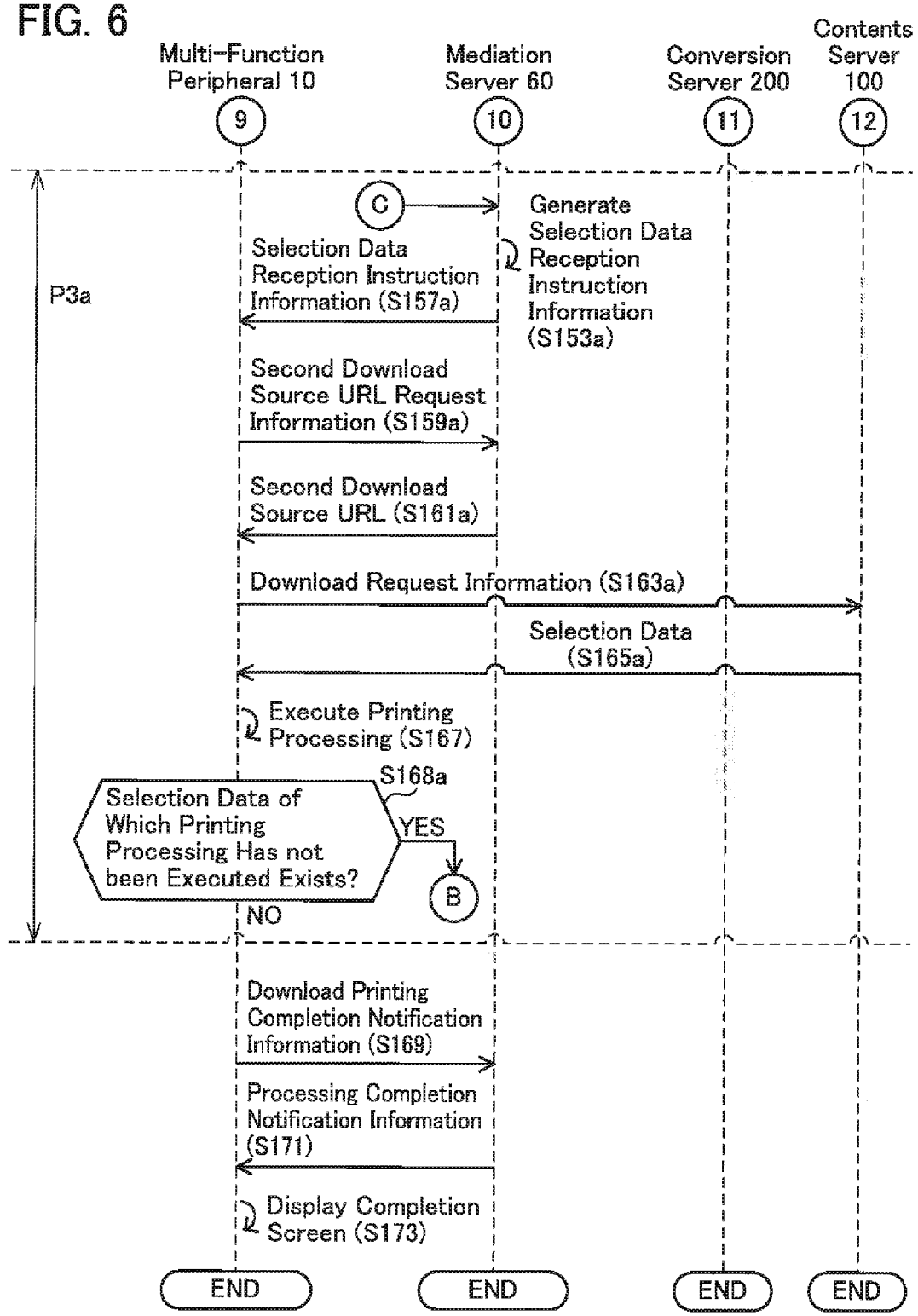
FIG. 6 shows a sequence diagram of various processing executed by each device.
Figure 7:
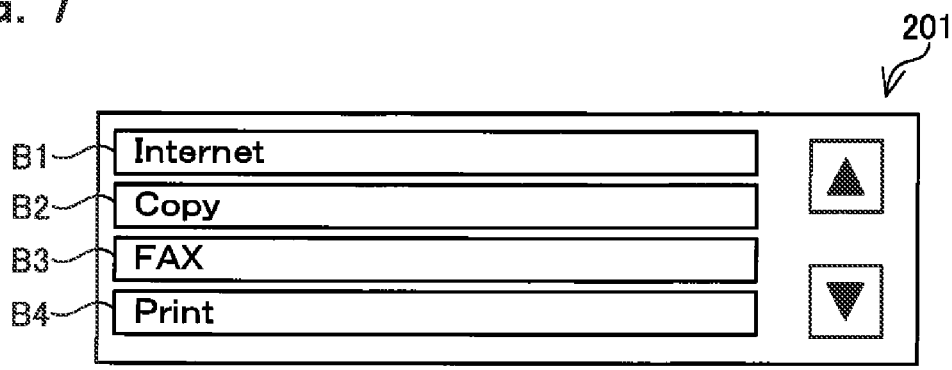
FIG. 7 shows an example of a main screen display.

The second printing processing P3a is explained using FIG. 6. The second printing processing P3a (S153a to S168a) is processing to cause the multi-function peripheral 10 to execute printing using selection data. In S153a, the CPU 72 of the mediation server 60 generates selection data reception instruction information. The selection data reception instruction information is an instruction to cause the multi-function peripheral 10 to receive the selection data and execute printing. The selection data reception instruction information includes information to order the multi-function peripheral 10 to access the contents server 100 and receive the selection data. In S157a, the CPU 72 transmits the selection data reception instruction information to the multi-function peripheral 10.

In S159a, the CPU 22 of the multi-function peripheral 10 transmits second download source URL request information to the mediation server 60. The second download source URL request information is information to request of the mediation server 60 a second download source URL in order to access selection data. In S161a, the CPU 72 of the mediation server 60 transmits the second download source URL to the multi-function peripheral 10. An example of the second download source URL used in S161a is the URL of the contents server 100.

In S163a, the CPU 22 of the multi-function peripheral 10 transmits the download request information to download the selection data to the contents server 100 based on the second download source URL. In S165a, the contents server 100 transmits selection data specified by the download request information to the multi-function peripheral 10. In S167, the CPU 22, of the multi-function peripheral 10 executes the printing processing.

In S168a, the CPU 22 determines whether selection data exists for which printing processing has not yet been executed. When selection data for which printing processing has not been executed exists (S168a: YES), the processing returns to S57 (FIG. 3); when selection data for which printing processing has not been executed does not exist (S168a: NO), the processing proceeds to S169, Subsequent processing is similar to first printing processing P3, and so an explanation is omitted.

(Effect)

In the mediation server 60 described in the present specification, when the selection data selected from among the data stored in the contents server 100 is the first type data which cannot be interpreted by the multi-function peripheral 10 (S57: YES), the selection data is converted into the converted data which can be interpreted by the multi-function peripheral 10 (S111 to S142), and the multi-function peripheral 10 can then be made to receive the data (S165). According to this, even when the selection data of the type which cannot be interpreted by the multi-function peripheral 10 is received by the multi-function peripheral 10 from the contents server 100, the printing processing and various other processing can be executed by the multi-function peripheral 10.

When the selection data is the second type data which can be interpreted by the multi-function peripheral 10 (S57: NO), the multi-function peripheral 10 can be made to receive the selection data from the contents server (S165a). Hence the selection data can be used by the multi-function peripheral 10 to execute various kinds of processing such as the printing processing (S167).

In the mediation server 60 described in the present specification, when the converted data reception information, which is information to cause the reception of the converted data by the multi-function peripheral 10, is received from the conversion server 200 (S121), the received converted data reception information can be transmitted to the multi-function peripheral 10 (S161). According to this, by using the converted data reception information, the multi-function peripheral 10 can be made to receive the converted data (S165).

In the mediation server 60 described in the present specification, the data detail information, including the extension indicating the data format of selection data and similar, can be received from the contents server (S55). Using the data detail information, the determination can be made as to whether the selection data is in the format which can be interpreted by the multi-function peripheral 10 (S57). According to this, the data format of the selection data can be reliably determined, and processing appropriate to the data format of the selection data can be performed.

In the mediation server 60 described in the present specification, during execution of the conversion processing, the wait command to cause the multi-function peripheral 10 to wait for the completion of the conversion processing can be transmitted to the multi-function peripheral 10 (S137). Further, in response to the completion of the conversion processing (S132: YES), the converted data reception information, which is information for performing the reception of the converted data by the multi-function peripheral 10, can be transmitted to the multi-function peripheral 10 (S161). Hence the situation in which the timeout or other error occurs in the multi-function peripheral 10 can be prevented.

In the communication system 2 described in the present specification, in the conversion server 200, the conversion processing of the selection data divided into prescribed data amounts (for example, 100 kB) can be performed. Further, upon the completion of the conversion of the prescribed data amount in the leading portion of the selection data (S132: YES), the converted data reception information for performing the reception of the converted data by the multi-function peripheral 10 can be transmitted to the multi-function peripheral 10 (S161). According to this, the multi-function peripheral 10 can be made to receive a portion of the data upon the completion of the conversion processing of a portion of the selection data, without waiting for completion of conversion processing of all the selection data. Hence the interval from the start of the conversion processing until the start of the reception of the converted data by the multi-function peripheral 10 can be shortened, so that a situation in which a timeout or other error occurs in the multi-function peripheral 10 can be prevented.

In the mediation server 60 described in the present specification, a determination is made as to whether there exists selection data for which conversion processing has not yet been executed at the time of generation of the converted data reception instruction information, and the information indicating the determination result (that is, conversion processing execution request information or conversion processing end request information) can be included in the converted data reception instruction information (S153). According to this, when the printing processing for one converted data item is completed (S169), based on the conversion processing execution request information or the conversion processing end request information generated in advance, the determination can be made as to whether there exists selection data for which conversion processing has not yet been executed (S170). Hence the conversion processing can be executed in sequence for the plurality of selection data items, and each time the conversion processing is completed, the multi-function peripheral 10 can be made to receive one converted data item.

In the communication system 2 described in the present specification, information such as the data selection instruction information (S41), the converted data reception information (S121), the conversion processing execution request information and the conversion processing end request information (S153), can be described using the URL description method. The URL description method is a widely known method, and thus when communicating the above information between the mediation server, the conversion server, contents server, and other devices, the method can be used without dependence on models.

The communication system 2 described in the present application comprises the mediation server 60 and the conversion server 200. The mediation server 60, conversion server 200, and contents servers 100 and 110 are interconnected through the Internet 6. Various kinds of data, such as selection data and converted data reception information, are communicated between the mediation server 60 and the conversion server 200. According to this, even when the mediation server 60 and the conversion server 200 are separate sewers, and are interconnected via a communication path, the multi-function peripheral 10 can be made to receive converted data.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications according to the above embodiments are listed below.

(Modifications)

Various methods may be used to cause the multi-function peripheral 10 to execute wait processing (S139) to wait for completion of conversion processing. For example, the multi-function peripheral 10 may execute wait processing upon receiving incomplete conversion notification information indicating that conversion processing has not been completed. The multi-function peripheral 10 may receive incomplete conversion notification information from the conversion server 200.

Processing to determine whether selection data is in a format which cannot be interpreted by the multi-function peripheral 10 is not limited to a configuration in which the processing is performed by the mediation server 60 as indicated in S57. For example, the processing may be performed by the multi-function peripheral 10. In this case, the mediation server 60 may transmit to the multi-function peripheral 10 data detail information received in S55. Based on the received data detail information, the multi-function peripheral 10 may determine whether the selection data is in a format which cannot be interpreted by the multi-function peripheral 10, and may transmit information indicating the determination result to the mediation server 60. As another modified example, information (for example, extensions) indicating the data formats of each of a plurality of data items stored in a contents server, included in data information received by the mediation server 60 in S33, may be transmitted to the multi-function peripheral 10 in S35. In S37, the CPU 22 of the multi-function peripheral 10, when accepting selection of selection data, may determine whether the selection data is in a format which can be interpreted by the multi-function peripheral 10 based on information indicating the data format. In S41, the CPU 22 may transmit information indicating the determination result to the mediation server 60 together with data selection instruction information.

In conversion processing order processing P1, a configuration may be used in which one execution order for conversion processing is applied to each of a plurality of selection data items uploaded to the conversion server 200. When execution orders for conversion processing have been applied to all selection data items, conversion processing order processing P1 may end, and processing may transition to wait command processing P2 and first printing processing P3. When conversion processing is completed in wait command processing P2 for one selection data item, and printing is completed in first printing processing P3, processing may return to wait command processing P2, and conversion processing and printing processing may be performed for the next one selection data item. In order to realize such a procedure, as S123 after S121 in FIG. 3, a step may be inserted of determining whether there exists selection data for which a conversion processing execution order has not yet been applied. When such selection data exists (S123: YES), processing returns to S73, and when such selection data does not exist (S123: NO), processing proceeds to S131. In S170 of FIG. 5, when there exists selection data for which conversion processing has not yet been executed (S170: YES), processing may return to S131.

In S132, various methods may be used as the method of determining whether conversion processing has completed. For example, when conversion processing has completed for all selection data, it may be determined that conversion processing has completed, resulting in a determination of YES in S132. In this case, in S161 the CPU 72 of the mediation server 60 transmits a first download source URL and converted data reception information to the multi-function peripheral 10 upon completion of conversion processing of all selection data. According to this, at the time at which the multi-function peripheral 10 transmits converted data reception information in S163, a state can be assumed in which all selection data has already been converted into converted data. Hence the occurrence of a situation in which, after the multi-function peripheral 10 starts reception of converted data, the completion of conversion processing is awaited, can be prevented.

S159 is not limited to a configuration in which the first download source URL is requested from the mediation server 60. When the server to be accessed to download converted data is fixed as the conversion server 200, an URL to access the conversion server 200 may be stored in advance in memory 24 of the multi-function peripheral 10. In this case, in S159 the URL to access the conversion server 200 may be read out from memory 24.

In S15, various configurations may be used to cause the display unit 14 to display the main screen. For example, when an order to display the main screen is input by the user to the operating unit 12, the multi-function peripheral 10 may access the mediation server 60. The mediation server 60 may create main screen data to cause display of the main screen, and may transmit the data to the multi-function peripheral 10. The multi-function peripheral 10 may display the main screen based on the main screen data.

In S165a, various configurations may be used for downloading selection data from the contents server to the multi-function peripheral 10. For example, a configuration may be used in which selection data is downloaded via the mediation server 60. In this case, in S159a the CPU 22 of the multi-function peripheral 10 may transmit to the mediation server 60 download request information to download the selection data. Next, the CPU 72 of the mediation server 60 may transmit download request information to the contents server 100, and may receive selection data from the contents server 100. Then, the CPU 72 may transmit the received selection data to the multi-function peripheral 10.

Figure 3:
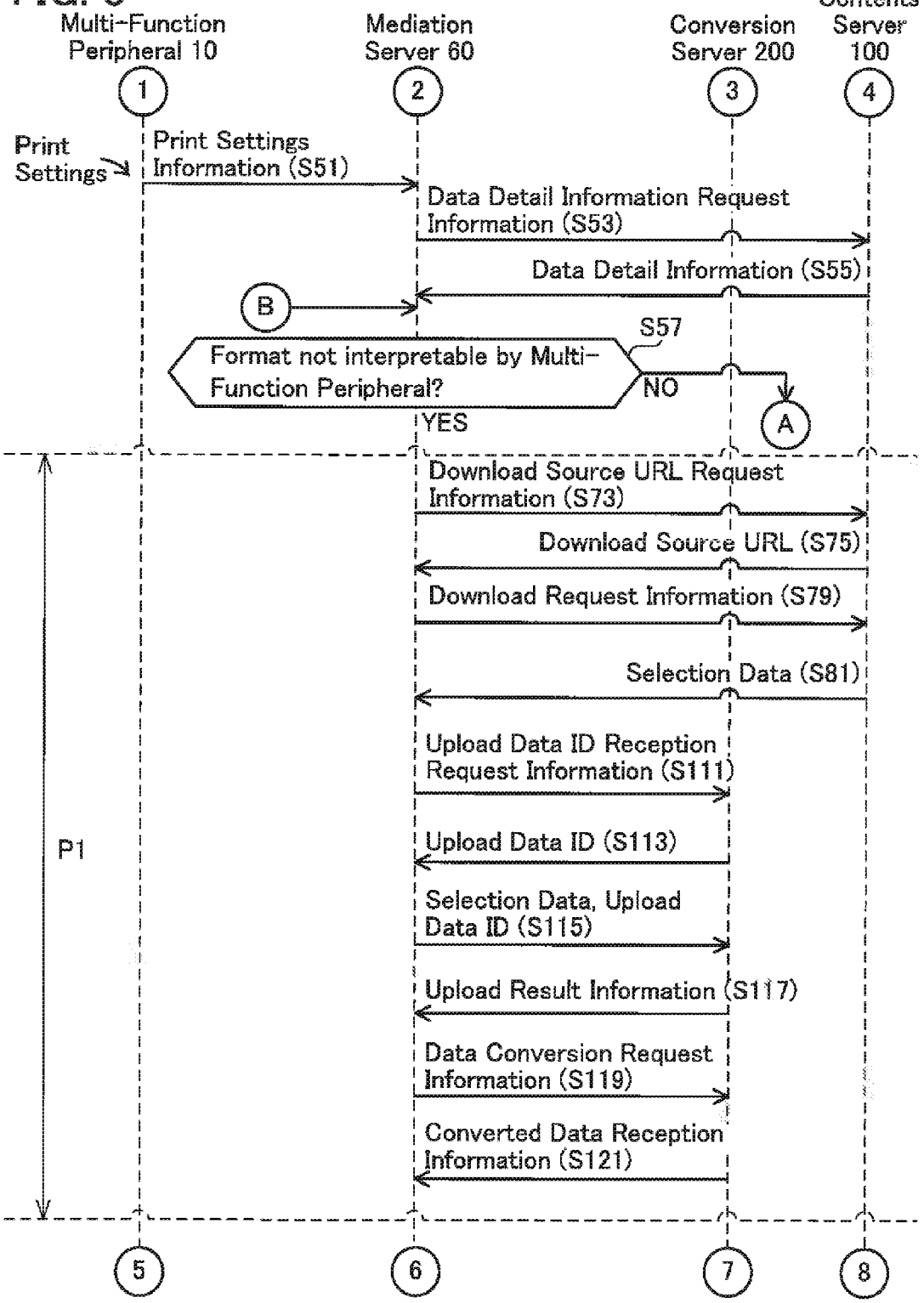
FIG. 3 shows a sequence diagram of various processing executed by each device.

In S57 of FIG. 3, when the selection data is in a format which can be interpreted by the multi-function peripheral 10 (S57: NO), processing may proceed to S153a in FIG. 6. According to this, the processing of S152 can be omitted.

Figure 4:
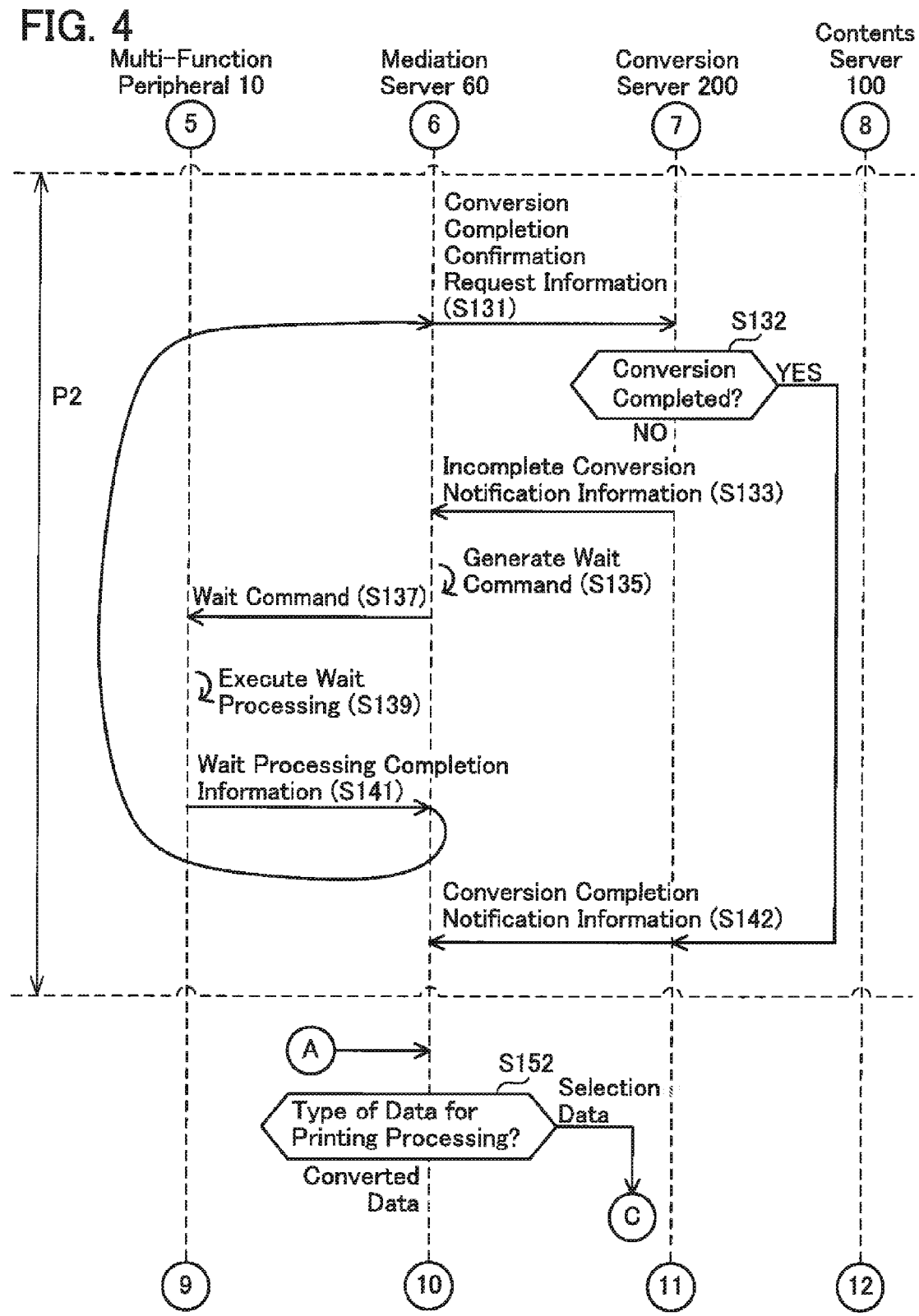
FIG. 4 shows a sequence diagram of various processing executed by each device.

Processing to cause the multi-function peripheral 10 to execute wait processing, described in S137 to S141 in FIG. 4, can be inserted into any position in the sequence diagrams of FIG. 2 to FIG. 6. For example, the processing of S137 to S141 may be inserted at an arbitrary position in the conversion processing order processing P1 (S73 to S121). This is because there are cases in which time is required for the processing to download selection data from the contents server 100 (S81), for the processing to upload selection data to the conversion server 200 (S115), and similar. By thus inserting the processing of S137 to S141, the occurrence of a timeout error can be prevented.

In the present embodiment, a case was explained in which contents servers 100 and 110 are connected to the Internet 6; but three or more contents servers may be connected to the Internet 6.

In the embodiment, the case is described in which the CPUs 22, 72 and 272 of the multi-function peripheral 10, the mediation server 60 and the mediation server 60 execute processing according to software, but is not limited thereto. At least a part of functions provided according to the software may be provided by hardware such as a logic circuit.

Each of the program 25, 75 and 275 may be executed by any one of the following configurations: a plurality of CPUs combined with each other; one or more ASICs (an abbreviation for application specific integrated circuit); and one or more CPUs and one or more ASICs combined with each other.

A concept that includes the mediation server 60 and the conversion server 200 may be referred to as a "relaying device". That is, the "relaying device" as claimed may include the configuration including the mediation server 60 and the conversion server 200 as described in the specification.

The invention claimed is:

1. A relaying device comprising:
a network interface configured to connect with a network;
a processor coupled to the network interface; and
a memory storing instructions, the instructions, when executed by the processor, causing the relaying device to perform:
transmitting, via the network interface, data information request information to a server device connected with the network, the data information request information being for requesting the server device to send, to the relaying device, at least one data identification information identifying respectively at least one data stored in the server device;
receiving the at least one data identification information from the server device via the network interface after the data information request information being transmitted;
generating data selection screen data in response to the reception of the at least one data identification information, the data selection screen data being data for causing an image processing device to display first options that respectively correspond to the at least one of data identification information, the image processing device being configured to execute an image processing and being connected with the network;
transmitting, via the network interface, the generated data selection screen data to the image processing device;
receiving, via the network interface, from the image processing device, data selection instruction information after the data selection screen data being transmitted, the data selection instruction information being information that corresponds to a selected first option that has been selected via an input interface included in the image processing device, among the first options displayed
receiving, from the server device via the network interface, data type information indicating whether selection data is a first type data or a second type data, the selection data being data corresponding to the data selection instruction information among the at least one data stored in the server device;
determining that the selection data is the first type data or the second type data based on the received data type information;
wherein when the selection data is the first type data, the instructions further causing the relaying device to perform:
transmitting, via the network interface to the server device, first download request information that requests transmission of the selection data, the first download request information including the data identification information identifying the selection data,
receiving, from the server device via the network interface, the selection data identified by the received data selection instruction information;
executing conversion processing in response to the reception of the selection data, the conversion processing converting the selection data of the first type data into converted data which can be interpreted by the image processing device;
transmitting converted data reception information to the image processing device the converted data reception information being for causing the image processing device to request the relaying device to transmit the converted data to the image processing device, and the converted data reception information being generated in the relaying device
receiving, via the network interface, from the image processing device, second download request information that requests transmission of the converted data;
transmitting, via the network interface, the converted data to the image processing device in response to the reception of the second download request information;
wherein when the selection data is the second type data, the instructions further causing the relaying device to perform:
transmitting selection data reception information to the image processing device via the network interface, the selection data reception information being for causing the image processing device to request the server device to transmit the selection data to the image processing device, the selection data reception information including the data identification information identifying the selection data.

2. The relaying device according to claim 1, wherein the executing conversion processing further includes transmitting a wait command to the image processing device via the network interface, the wait command being configured to cause the image processing device to wait for transmission of the second download request information for a predetermined time, and
the transmitting of the converted data reception information includes transmitting, in response to the completion of the conversion processing, the converted data reception information to the image processing device via the network interface.

3. The relaying device according to claim 2, wherein the conversion processing is performed for each prescribed data amount determined in advance, and
the transmitting of the converted data reception information includes transmitting the converted data reception information to the image processing device via the network interface, in response to the completion of the conversion processing of a first prescribed data amount among the selection data.

4. The relaying device according to claim 2, wherein the transmitting of the converted data reception information includes transmitting the converted data reception information to the image processing device via the network interface, in response to the completion of the conversion processing of all of the selection data.

5. The relaying device according to claim 1, wherein:
the executing conversion processing includes executing the conversion processing on a plurality of selection data;
the instructions further cause the relaying device to perform transmitting converted data reception instruction information to the image processing device via the network interface each time the conversion processing is completed for one selection data,
the converted data reception instruction information being configured to cause the image processing device to request the relaying device to transmit the converted data to the image processing device,
the converted data reception instruction information is configured to include conversion processing execution request information in a case that there exists selection data of which conversion processing has not yet been executed,
the conversion processing execution request information being information which, after the image processing device has received the converted data based on the converted data reception information, causes the image processing device to request start of the conversion processing on the selection data of which conversion processing has not yet been executed; and
the converted data reception instruction information is configured to include conversion processing end request information in a case that there exists no selection data of which conversion processing has not yet been executed,
the conversion processing end request information being information which, after the image processing device has received the converted data based on the converted data reception information, causes the image processing device to request that the conversion processing be ended.

6. The relaying device according to claim 1, wherein the data selection instruction information and the converted data reception information are described using a URL (Uniform Resource Locator) description method.

7. The relaying device according to claim 1, wherein the instructions further cause the relaying device to perform:
transmitting, to the image processing device via the network interface, information indicating that conversion processing is in progress during execution of the conversion processing; and
transmitting the converted data to the image processing device via the network interface in response to completion of the conversion processing.

8. The relaying device according to claim 1, wherein:
a mediation server comprises a mediation server network interface configured to connect with the network;
a conversion server comprises a conversion server network interface configured to connect with the network;
the mediation server is configured to perform:
receiving the selection data transmitted from the server device; and
transmitting the received selection data to the conversion server via the mediation server network interface;
the conversion server is configured to perform executing the conversion processing, on the selection data received from the mediation server via the conversion server network interface; and the mediation server is further configured to perform:
receiving the converted data reception information transmitted from the conversion server; and
transmitting the converted data reception information, to the image processing device via the mediation server network interface,
the converted data reception information being information to cause the image processing device to receive the selection data from the conversion server.

9. The relaying device according to claim 8, wherein the mediation server is further configured to perform transmitting a wait command to the image processing device via the mediation server network interface,
the wait command being configured to perform causing the image processing device to wait for completion of the conversion processing during a period from transmitting the selection data to the conversion server until receiving information, which is transmitted from the conversion server and which indicates completion of the conversion processing.

10. The relaying device according to claim 1, wherein transmitting, via the network interface to the image processing device, server selection screen data for causing the image processing device to display second options that respectively correspond to a plurality of server devices,
receiving, via the network interface from the image processing device, selection server identification information identifying a selection server device after the server selection screen data being transmitted,
the selection server device being a server device that corresponds to a selected second option that has been selected via the input interface included in the image processing device, among the second options displayed in the display,
wherein the data selection screen data is generated for the selection server device identified by the received selection server identification information.

11. The relaying device according to claim 10, wherein transmitting, via the network interface, image processing selection screen data to the image processing device, the image processing selection screen data being data for causing an image processing device to display third options that respectively correspond to a plurality of image processings, the plurality of image processings being image processings that can be executed in the image processing device and executed for the at least one data stored in the selection server device, and the third options includes at least one of an option corresponding to printing and an option corresponding to storing;
receiving, from the image processing device via the network interface, selection processing identification information identifying a selection processing after the image processing selection screen data being transmitted, the selection processing being an image processing that corresponds to a selected third option that has been selected via the input interface included in the image processing device, among the third options displayed in the display,
wherein in the transmitting of the converted data reception information, the converted data reception information and selection processing execution information are transmitted to the image processing device via the network interface, the selection processing execution information being information that instructs the image processing device to execute the selection processing indicated by the received selection processing identification information, and wherein in the transmitting of the selection data reception information, the selection data reception information and the selection processing execution information are transmitted to the image processing device via the network interface.

12. An image processing device comprising:
a network interface configured to connect with a network;
an input interface;
a display; and
a control device coupled to the network interface and configured to perform:
receiving, via the input interface, a first operation for selecting a selection server device from among a plurality of server devices connected with the network, the selection server device being configured to store first type data which cannot be interpreted by the image processing device and second type data which can be interpreted by the image processing device, the first type data being data in a document file format, and the second type data being data in an image file format;
transmitting, via the network interface, to a relaying device connected with the network, selection server identification information identifying the selection server device selected by the first operation;
receiving, via the network interface, data selection screen data from the relaying device after the selection server identification information being transmitted, the data selection screen data being data for causing the display to display first options that respectively correspond to a plurality of data identification information, the plurality of data identification information being for identifying respectively a plurality of data stored in the selection server device;
causing the display to display the first options based on the received data selection screen data;
receiving, via the input interface, a second operation for selecting a selected first option among the first options displayed in the display; and
transmitting, via the network interface to the relaying device, data selection instruction information that corresponds to the selected first option,
wherein when selection data is the first type data, the selection data being data corresponding to the data selection instruction information among the plurality of data stored in the selection server device, the control device is further configured to perform:
receiving, from the relaying device via the network interface, converted data reception information after the data selection instruction information being transmitted, the converted data reception information being for causing the image processing device to request the relaying device to transmit the converted data to the image processing device, and the converted data being data obtained by converting a format of the selection data to an interperable format which can be interpreted by the image processing device;
transmitting, via the network interface, to the relaying device based on the received converted data reception information, first download request information that requests transmission of the converted data;
receiving, from the relaying device via the network interface, the converted data after the first download request information being transmitted wherein when the selection data is the second type data, the control device is further configured to perform:
receiving, from the relaying device via the network interface, selection data reception information after the data selection instruction information being transmitted
transmitting, via the network interface to the selection server device based on the received selection data reception information, second download request information that requests transmission of the selection data;
receiving, from the server device via the network interface, the selection data after the second download request information being transmitted; and
executing the image processing to the received selection data.

13. The image processing device according to claim 12, wherein:
the control device is further configured to perform transmitting information for requiring user interface information to the relaying device via the network interface,
the user interface information being for displaying a user interface image on a display of the image processing device,
the interface image being for receiving a selection of the selection data.

14. The image processing device according to claim 12, wherein:
the converted data reception information is information indicating a storage location of the converted data in the relaying device and is described using a URL (Uniform Resource Locator) description method; and
the selection data reception information is information indicating a storage location of the selection data in the server device and is described using the URL description method.

15. The image processing device according to claim 12, wherein:
the relaying device is configured to perform executing the conversion processing on a plurality of selection data;
the control device is further configured to perform receiving converted data reception instruction information from the relaying device via the network interface, each time the conversion processing is completed for one selection data,
the converted data reception instruction information being for causing the image processing device to request the relaying device to transmit the converted data to the image processing device;
the converted data reception instruction information is configured to include:
conversion processing execution request information in a case that there exists selection data of which conversion processing has not yet been executed, and
conversion processing end request information in a case that there exists no selection data of which conversion processing has not yet been executed; and
the control device is further configured to perform:
transmitting via the network interface, information for requiring the relaying device to start of the conversion processing on the selection data of which conversion processing has not yet been executed after the image processing device has received the converted data based on the converted data reception information, in a case that the converted data reception instruction information includes the conversion processing execution request information, and
transmitting via the network interface, information for requiring the relaying device to terminate the conversion processing after the image processing device has received the converted data based on the converted data reception information, in a case that the converted data reception instruction information includes the conversion processing end request information.

16. The image processing device according to claim 12, wherein
the control device is further configured to perform:
executing an error processing in a case that a predetermined time has elapsed from transmitting various types of information for requiring various types of processing to the relaying device;
receiving the converted data based on the received converted data reception information without executing the error processing, in a case that the information for requiring the converted data reception information has been transmitted to the relaying device, where the converted data reception information is received before the predetermined time elapses from when the converted data reception information has been transmitted ; and
waiting the termination of the conversion processing without executing the error processing, in a case that the information for requiring the converted data reception information has been transmitted to the relaying device, where information indicating that the relaying device is currently executing the conversion processing is received from the relaying device via the network interface.

17. A system comprising an image processing device and a relaying device,
the image processing device comprising:
an input interface;
a display;
a first network interface configured to connect with a network and
a control device coupled to the first network interface,
the relaying device comprising:
a second network interface configured to connect with the network;
a processor coupled to the second network interface; and
a memory storing instructions,
wherein the instructions, when executed by the processor of the relaying device, cause the relaying device to perform:
transmitting, via the second network interface, data information request information to a server device connected with the network, the data information request information being for requesting the server device to send, to the relaying device, at least one data identification information identifying respectively at least one data stored in the server device;
receiving the at least one data identification information from the server device via the second network interface after the data information request information being transmitted;
generating data selection screen data in response to the reception of the at least one data identification information, the data selection screen data being data for causing the image processing device to display first options that respectively correspond to the at least one of data identification information, the image processing device being configured to execute an image processing;
transmitting, via the second network interface, the generated data selection screen data to the image processing device;

the control device of the image processing device is configured to perform:
receiving, via the first network interface, data selection screen data from the relaying device;
causing the display to display the first options based on the received data selection screen data;
receiving, via the input interface, an operation for selecting a first option among the first options displayed in the display as a selected first option; and
transmitting, via the first network interface to the relaying device, data selection instruction information that corresponds to the selected first option,
the instructions, when executed by the processor of the relaying device, cause the relaying device to perform:
receiving, from the image processing device via the second network interface, the data selection instruction information after the data selection screen data being transmitted;
receiving, from the server device via the second network interface, data type information indicating whether selection data is a first type data or a second type data, the selection data being data corresponding to the data selection instruction information among the at least one data stored in the server device, the first type data which cannot be interpreted by the image processing device and second type data which can be interpreted by the image processing device, the first type data being data in a document file format, and the second type data being data in an image file format;
determining that the selection data is the first type data or the second type data based on the received data type information;
wherein when the selection data is the first type data, the instructions further causing the relaying device to perform:
transmitting, via the second network interface to the server device, first download request information that requests transmission of the selection data, the first download request information including the data identification information identifying the selection data,
receiving, from the server device via the second network interface, the selection data identified by the received data selection instruction information;
executing conversion processing in response to the reception of the selection data, the conversion processing converting the selection data into converted data which can be interpreted by the image processing device;
transmitting, via the second network interface, converted data reception information to the image processing device, the converted data reception information being for causing the image processing device to request the relaying device to transmit the converted data to the image processing device, and the converted data reception information being generated in the relaying device;
receiving, via the second network interface from the image processing device, second download request information that requests transmission of the converted data; and
transmitting, via the second network interface, the converted data to the image processing device in response to the reception of the second download request information,
wherein when selection data is the first type data, the control device of the image processing device is further configured to perform:

receiving, from the relaying device via the first network interface, the converted data reception information after the data selection instruction information being transmitted;

transmitting, via the first network interface to the relaying device based on the received converted data reception information, the second download request information that requests transmission of the converted data;

receiving, via the first network interface, the converted data from the relaying device after the second download request information being transmitted; and executing an image processing to the received converted data, and wherein when the selection data is the second type data, the instructions further causing the relaying device to perform: transmitting selection data reception information to the image processing device via the second network interface, the selection data reception information being for causing the image processing device to request the server device to transmit the selection data to the image processing device, and the selection data reception information including the data identification information identifying the selection data, wherein when the selection data is the second type data, the control device of the image processing device is further configured to perform:

receiving, via the first network interface, the selection data reception information from the relaying device after the data selection instruction information being transmitted;

transmitting, via the first network interface to the server device based on the received selection data reception information, third download request information that requests transmission of the selection data;

receiving, via the first network interface, the selection data from the server device after the third download request information being transmitted; and executing the image processing to the received selection data.

18. The image processing device according to claim 12, wherein the control device is further configured to perform:

receiving, via the network interface from the relaying device, server selection screen data for causing the image processing device to display second options that respectively correspond to the plurality of server devices;

causing the display to display the second options based on the received server selection screen data; and receiving, via the input interface, the first operation for selecting an option from among the second options as the selection server device.

19. The image processing device according to claim 18, wherein the control device is further configured to perform:

receiving, via the network interface, image processing selection screen data from the relaying device, the image processing selection screen data being data for causing an image processing device to display third options that respectively correspond to a plurality of image processings, the plurality of image processings being image processings that can be executed in the image processing device and executed for the plurality of data stored in the selection server device, and the third options includes at least one of an option corresponding to printing and an option corresponding to storing;

causing the display of the third options based on the received image processing selection screen data;

receiving, via the input interface, a second operation for selecting a selected third option among the third options displayed; and transmitting, to the relaying device via the network interface, selection processing identification information identifying a selection processing, the selection processing being an image processing that corresponds to the selected third option that has been selected via the input interface, among the third options displayed, wherein in the receiving of the converted data reception information, the converted data reception information and selection processing execution information are received from the relaying device via the network interface, the selection processing execution information being information that instructs the image processing device to execute the selection processing indicated by the transmitted selection processing identification information, and wherein in the receiving of the selection data reception information, the selection data reception information and the selection processing execution information are received from the relaying device via the network interface.

* * * * *